Patented July 28, 1931

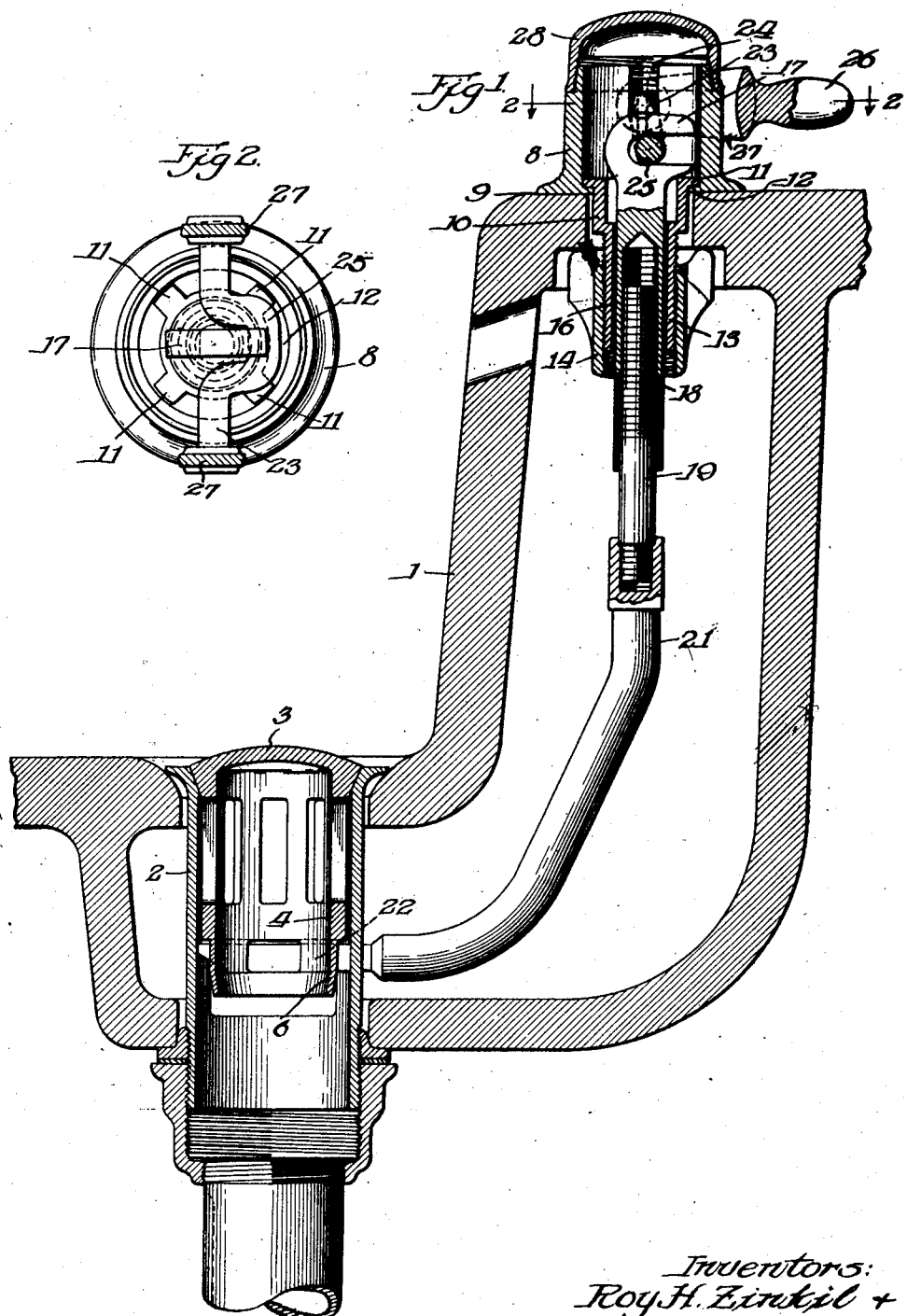

1,816,458

UNITED STATES PATENT OFFICE

ROY H. ZINKIL AND OTTO C. OSTERHAGE, OF CHICAGO, ILLINOIS, ASSIGNORS TO CRANE CO., OF CHICAGO, ILLINOIS, A CORPORATION OF ILLINOIS

LEVER ACTION WASTE

Application filed July 14, 1930. Serial No. 467,710.

This invention relates to waste operating mechanisms and has for its purpose to provide a mechanism that is not dependent upon friction or balancing device and yet is positive in action, easy to operate and self-locking in either open or closed position.

In accordance with this invention, a rigid member is employed to actuate the waste plug and means are associated therewith to positively actuate the member and to lock the same particularly in open position in such a manner that the waste plug cannot be accidentally or inadvertently closed. In the preferred form the member actuating mechanism takes the form of an offset or crank-like arm cooperative with a hooked end upon the member.

A better understanding will be had of this invention from a consideration of the following detailed description given in connection with the drawings, in which:

Fig. 1 is a vertical section through the center of a waste operating mechanism and including a portion of a receptacle such as a lavatory;

Fig. 2 is a fragmentary section on line 2—2 but with the handle in vertical position illustrating the operating mechanism in partially opened position.

Referring particularly to the drawings, it will be seen that for purposes of illustration this invention has been shown as applied directly to a portion of a lavatory 1, although it may be secured to a fixture or any other convenient member. The lavatory is provided with the usual waste 2 adapted to be closed by a waste plug 3. The waste plug 3 is of the type adapted to fall by its own weight into closing position and is formed with an integral sleeve-like guiding portion 4 having a grooved end 6.

The plug is operated by mechanism comprising this invention and is composed of a cup-like body member 8 having a base flange 9 suitable to be secured to any suitable fitting or fixture such as the top of a lavatory, by a locking sleeve and rod guide 10. The guide member is formed with out-turned or projecting fingers 11 to engage a complementary inturned flange 12 of the body and also with the lower end thereof threaded exteriorly as at 13 to receive a locking nut 14.

Slidingly mounted within the interior bore of the guide 9 is a hooked rod 16 formed upon its upper end with a hook 17 and threaded internally as at 18 to receive one end of an adjusting stud 19. The lower end of the stud 19 engages the upper end of a rigid forked lever 21. The lower end of the lever 21 is forked as at 22 to freely engage the grooved end 6 of the waste plug.

The lever is actuated in a substantially vertical direction by means of a crank pin 23 journalled in slots 24 formed in the upper end of the body. The crank pin 23 is formed with a center offset or crank portion 25 which engages the hooked end of the hook rod. A handle 26 of substantial mass and having bifurcated arms 27 which pass around the body, is pinned to the outer ends of crank pin 23 in order to rotate the latter. A dome-like cap 28 is threaded to the upper end of the body 8 and serves to inclose the body and to hold the crank pin within its bearing slots.

As can be seen from Fig. 1, the crank pin and handle are arranged so that the offset portion 25 will be in lower vertical position with the plug 3 in its lower or closed position and with the handle in horizontal position. The adjusting rod 19 will permit adjustments to produce this relation. It follows therefore that should the handle 26 be rotated over and to the other side of the housing, the offset portion 25 will first be raised into a horizontal position as shown in Fig. 2, then to a substantially vertical position directly opposite to that position shown in Fig. 1 and will be held in this upper vertical position by the weight of the handle 26 which will then be in a horizontal position diametrically opposite to that shown in Fig. 1. It is to be noticed that the crank is at an angle slightly less than 90° from the handle. Accordingly when the handle is in horizontal open position the crank will have moved slightly past top vertical position. The weight of the waste plug when in open position will also tend to lock the handle and latch in open position and prevent accidental closing of the plug.

It follows from the above that there is provided a waste operating mechanism which is positive in its action, which is self-locking particularly in its open position and which does not depend upon friction or balancing devices to retain it in position.

It is obvious that changes may be made in the details of the construction without departing from the spirit and scope of the invention as defined in the claims appended hereto.

We claim:

1. In a waste operating mechanism, a body, a rod having a hooked end projecting into said body, a crank pin engaging said hooked end and arranged to positively raise and lower said rod, and means for actuating said crank pin.

2. In a waste operating mechanism, a body, a separable guide secured to said body, a rod slidingly mounted in said guide, said rod having a hooked end projecting into said body, a crank pin within said body engaging said hooked end and arranged to positively raise and lower said rod, and means for actuating said crank pin and maintaining the same in either of two positions.

3. In a waste operating mechanism, a body, a guide member secured to said body, a hooked rod slidably mounted within said guide member and projecting into said body, a crank pin journalled in the side walls of said body and engaging said rod to positively raise and lower the same substantially vertically, and a handle secured to said crank pin.

4. In a waste operating mechanism, a body, a guide member secured to said body, a hooked rod slidably mounted within said guide member and projecting into said body, a crank pin journalled in the side walls of said body and engaging said rod to move the same substantially vertically, and a cap inclosing the upper end of said body and arranged to maintain said crank pin in said body.

5. In a waste operating mechanism, a body, a guide member secured to said body and removable therefrom, a hooked rod slidably mounted within said guide member and projecting into said body, a crank pin journalled in the side walls of said body and engaging said rod to move the same substantially vertically, and a handle secured to said crank pin, said handle having a pair of arms extending around said body and engaging the terminating ends of said crank pin.

6. In a waste operating mechanism, a body, means for securing said body to a fixture, a guide removably secured to said body, a hooked rod slidingly mounted in said guide, a crank pin journalled in said body and engaging said hooked rod to move the same substantially vertically and a handle for actuating said crank pin, said body securing means also being arranged to secure said guide within said body.

7. In a waste operating mechanism, a body, the side walls of which are provided with a pair of spaced slots, a crank pin journalled in said slots, a hooked rod projecting into said body for engaging the crank pin and a cap enclosing the upper end of said body and engaging said crank pin to retain the latter within the slots of the body.

In witness of the foregoing we affix our signatures.

ROY H. ZINKIL.
OTTO C. OSTERHAGE.